July 10, 1945.  H. F. BANZHAF ET AL  2,379,858
WINCH
Filed Dec. 15, 1941   7 Sheets-Sheet 1
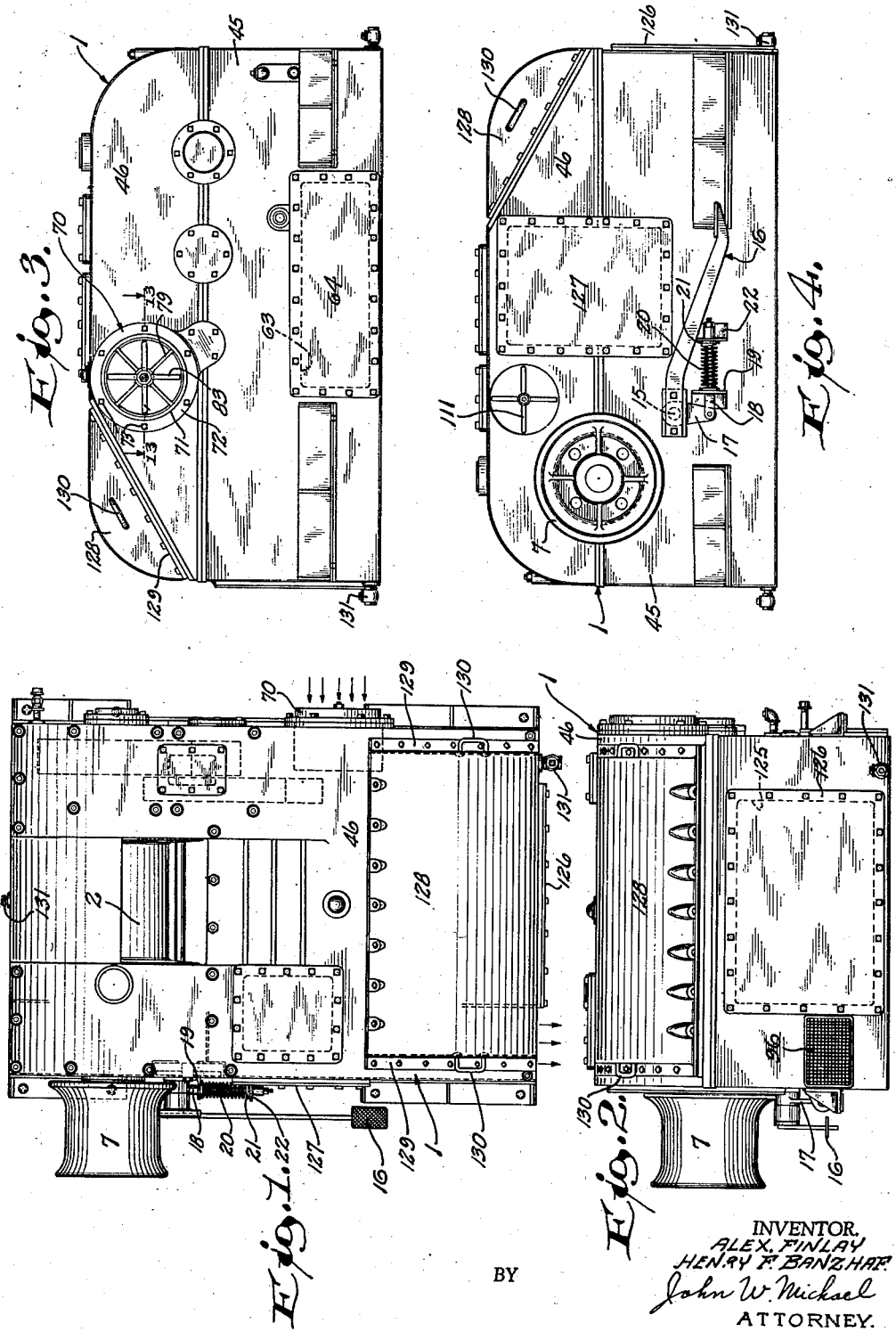
INVENTOR.
ALEX. FINLAY
HENRY F. BANZHAF.
BY John W. Michael
ATTORNEY.

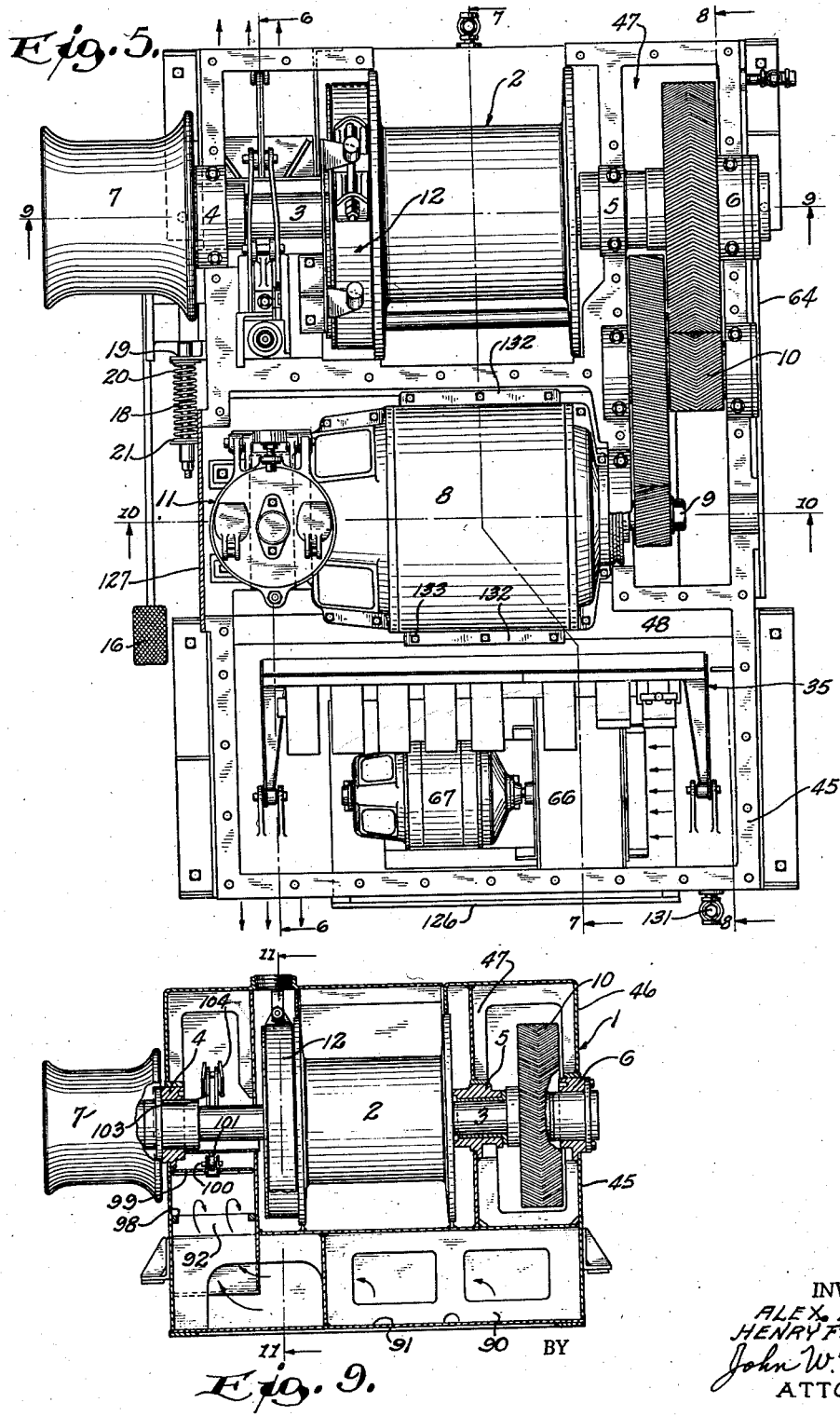

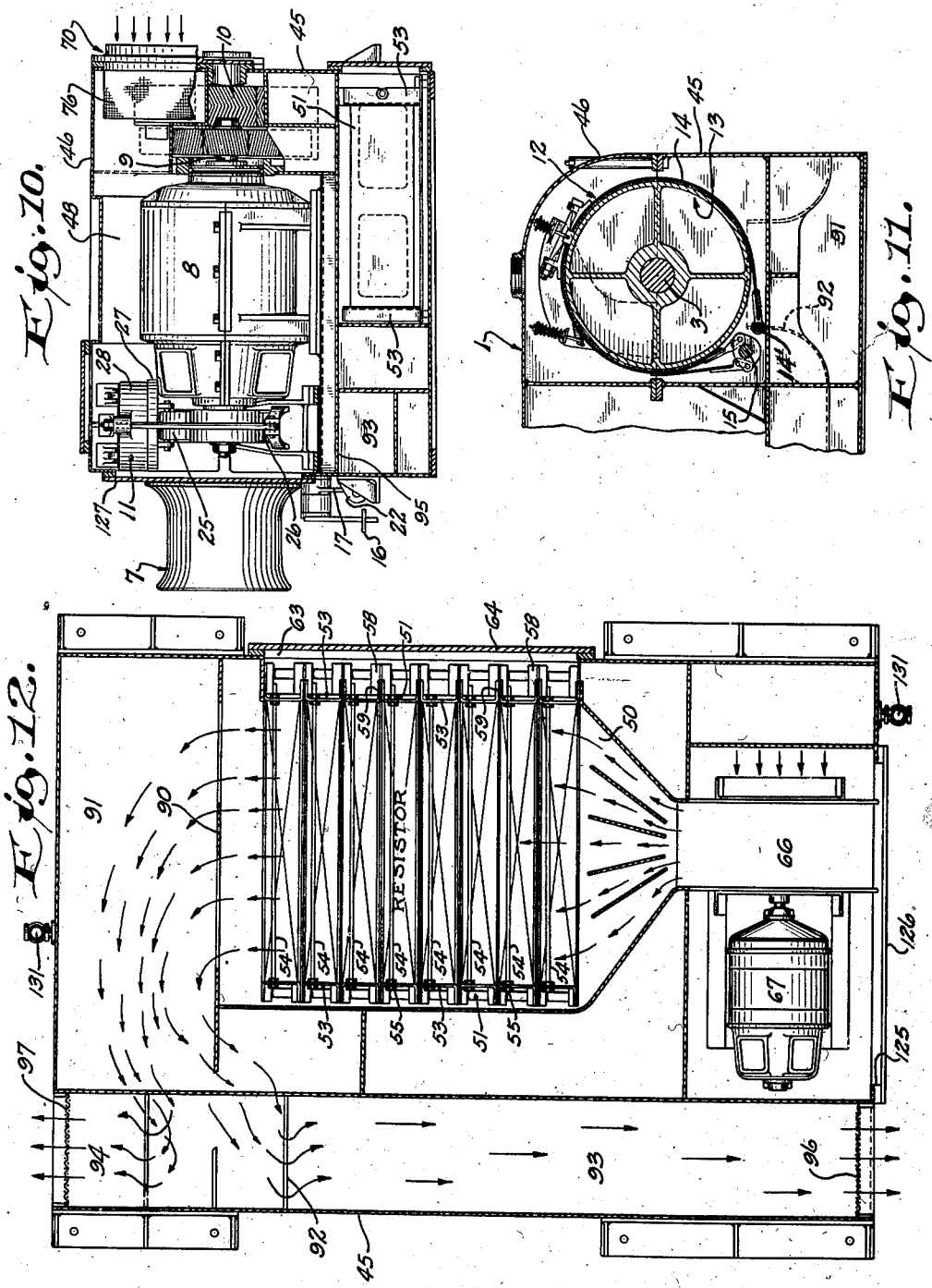

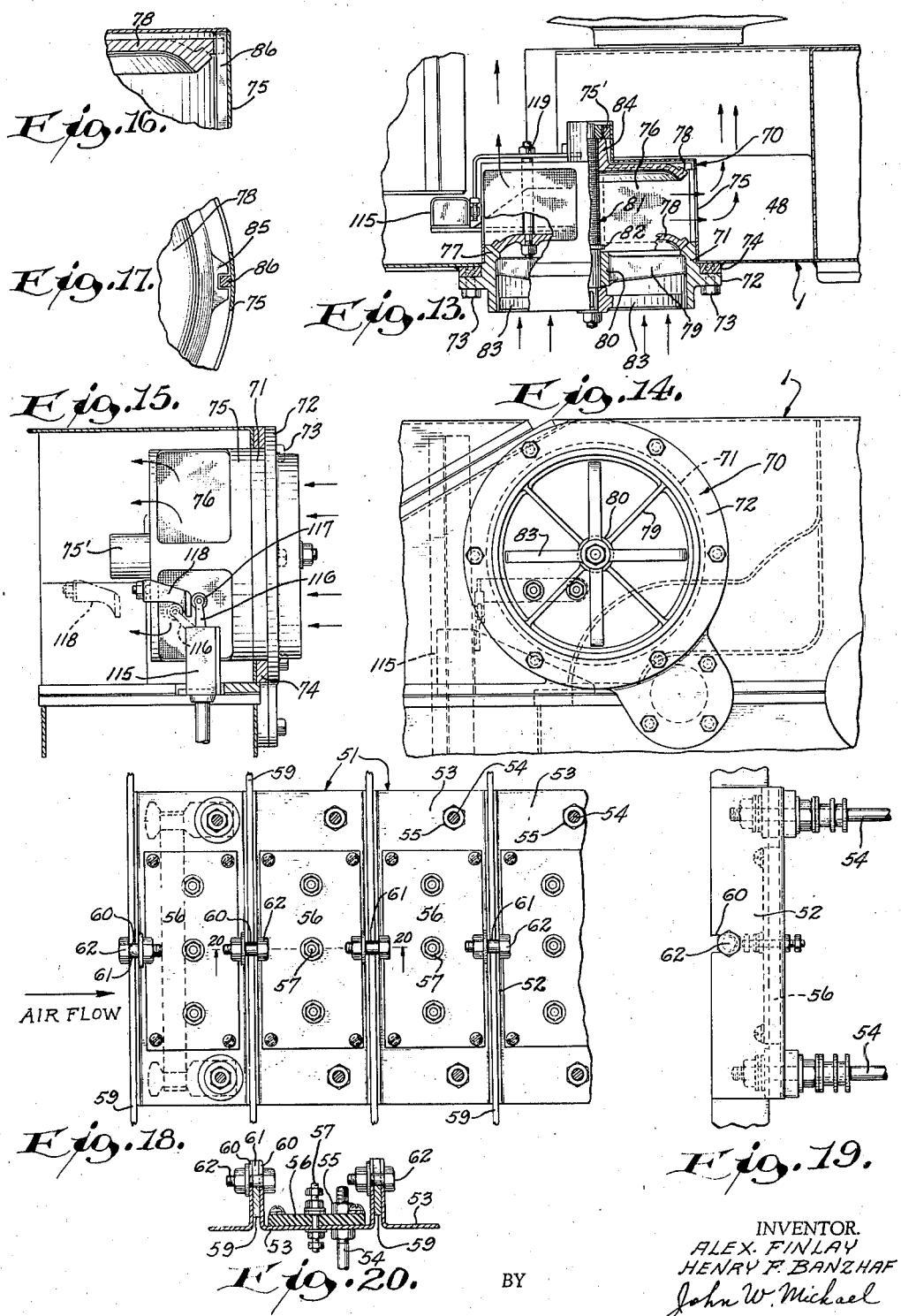

July 10, 1945. H. F. BANZHAF ET AL 2,379,858
WINCH
Filed Dec. 15, 1941 7 Sheets-Sheet 6
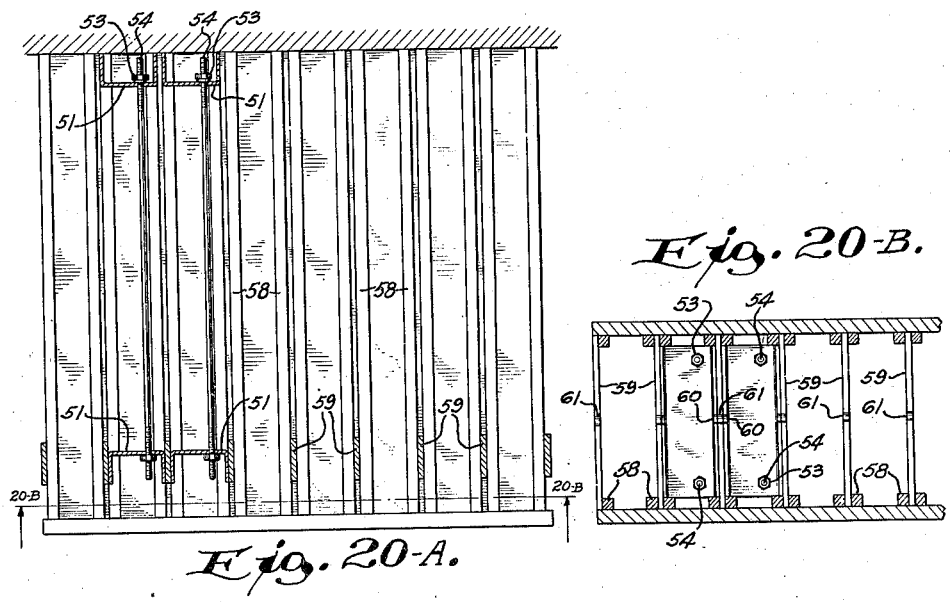
Fig. 20-A. Fig. 20-B.
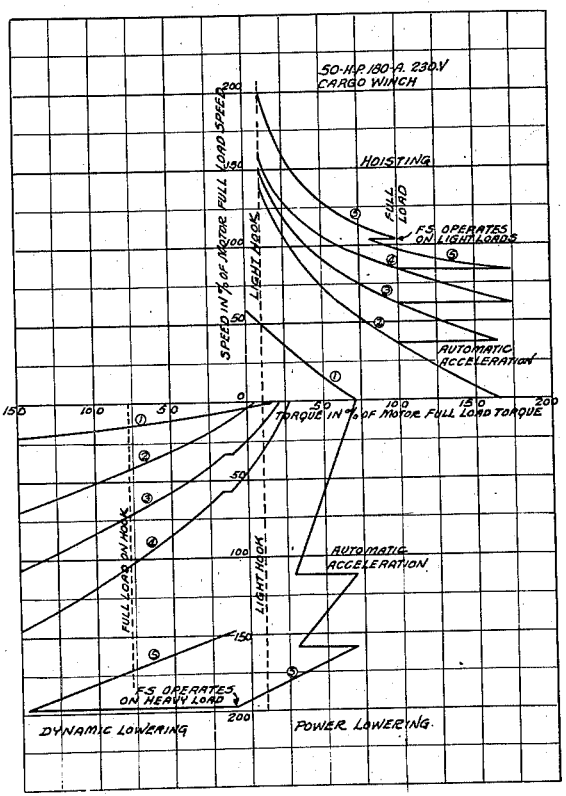
Fig. 26.
INVENTOR.
ALEX. FINLAY
HENRY F. BANZHAF.
BY John W. Michael
ATTORNEY.

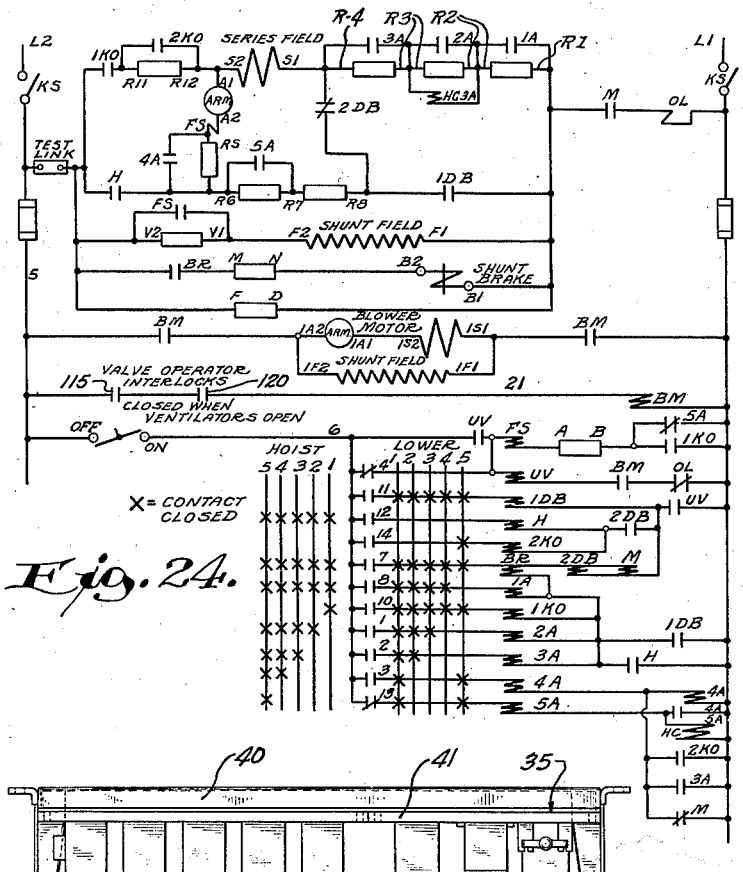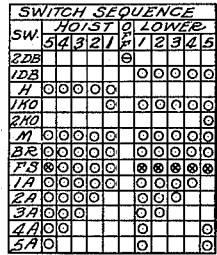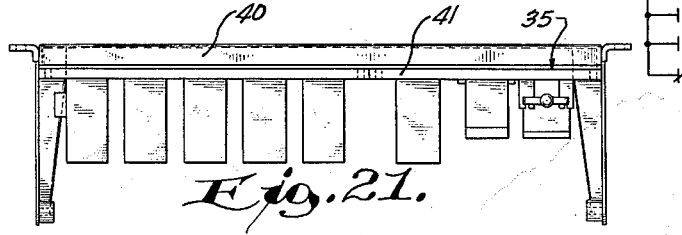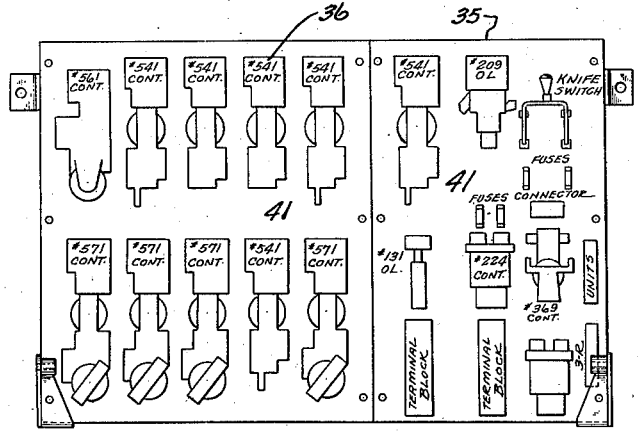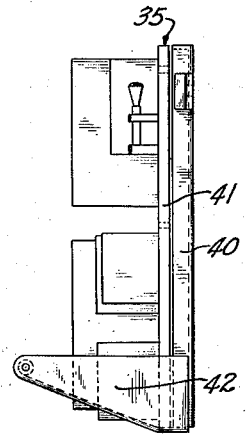

Patented July 10, 1945

2,379,858

UNITED STATES PATENT OFFICE 2,379,858

WINCH

Henry F. Banzhaf, Milwaukee, Wis., and Alexander Finlay, Marquette, Mich., assignors, by mesne assignments, to American Hoist & Derrick Company, St. Paul, Minn., a corporation of Delaware Application December 15, 1941, Serial No. 423,056

15 Claims. (Cl. 254—186)

This invention relates in general to an improvement in winches, and more especially to an improvement in cargo winches particularly designed and adapted for use in loading and unloading cargo ships, although, obviously, also well adapted for other uses and applications.

Heretofore it has been the practice to employ electric motor-driven cargo winches for use in loading and unloading cargo ships. The control instrumentalities employed for regulating the action of electric motors for cargo winches usually comprise a suitable number of resistors, cut in and out of the motor circuit, by manipulating a controller or master switch, the latter exercising its controlling function through suitable contactors and relays. These control instrumentalities are either housed in a specially constructed deck house or in the hold or other protected part of the ship, so that when the ship puts to sea they may be completely housed and protected. This expedient, of course, requires that the control instrumentalities be wired to the motor. Time and money must be expended to effect this wiring of the parts.

The object of the present invention is to provide a cargo winch wherein the control instrumentalities, such as the resistors, control panel, its contactors, and the like, are all constituted as a unit assembly, the same housing which encloses the electric motor and the gearing between it and the drum of the winch, the winch brake, and the like, serving also as an enclosure for the control instrumentalities, and provision is made for completely sealing the housing when the ship goes to sea so that even though waves should wash over the winch the control instrumentalities and other parts within the confines of the housing will be completely protected. When the winch is in operation the main driving motor and the control instrumentalities are continuously cooled and ventilated so that the heat they give off will be dissipated to the atmosphere and their capacity for efficient functioning will not be impaired. A unitary, completely wired and fully enclosed and protected assembly, and one which may be left secured in its position on the deck of the ship at all times, is thus provided.

Another object of the invention is to provide a winch of this character in which the various elements, although completely housed and protected, are readily and easily accessible for purposes of service, inspection, replacement, or repair.

A still further object of the invention is to provide a cargo winch having these advantages and capacities, and which is simple, closely organized, and compact in construction, reliable and efficient in operation, possessed of qualities of ruggedness and durability, and easy and comparatively inexpensive to manufacture, operate, and maintain.

Other objects and advantages reside in certain novel features of the construction, arrangement, and combination of parts which will be hereinafter more fully described and particularly pointed out in the appended claims, reference being had to the accompanying drawings forming a part of this specification, and in which:

Figure 1 is a view in top plan of a cargo winch embodying the present invention;

Figure 2 is a view in end elevation of the cargo winch shown in Figure 1;

Figure 3 is a view in side elevation, looking toward the right hand side of Figure 1;

Figure 4 is a view in side elevation looking toward the left hand side of Figure 1;

Figure 5 is a view of the cargo winch in top plan, the upper section of the housing being entirely removed to illustrate the elements of the winch contained within the housing;

Figure 6:
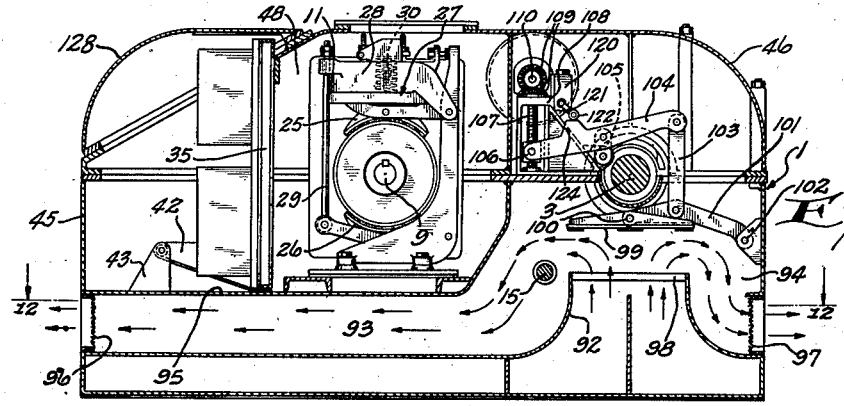
Figure 7:
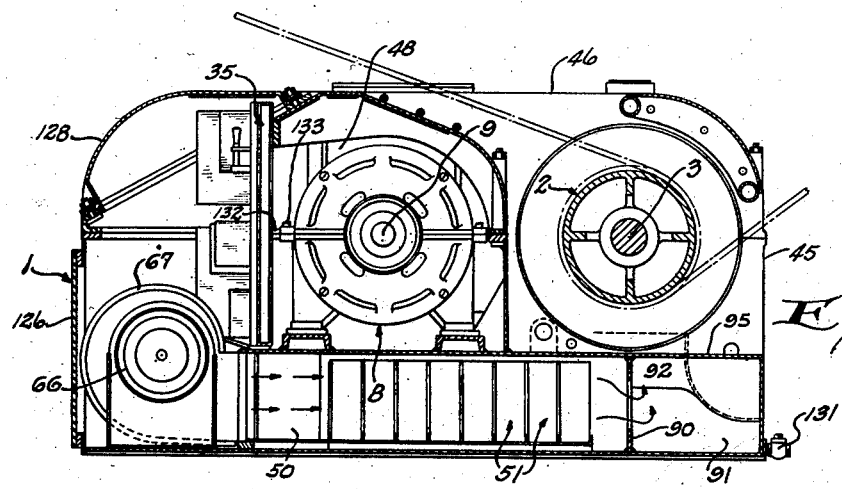
Figure 8:
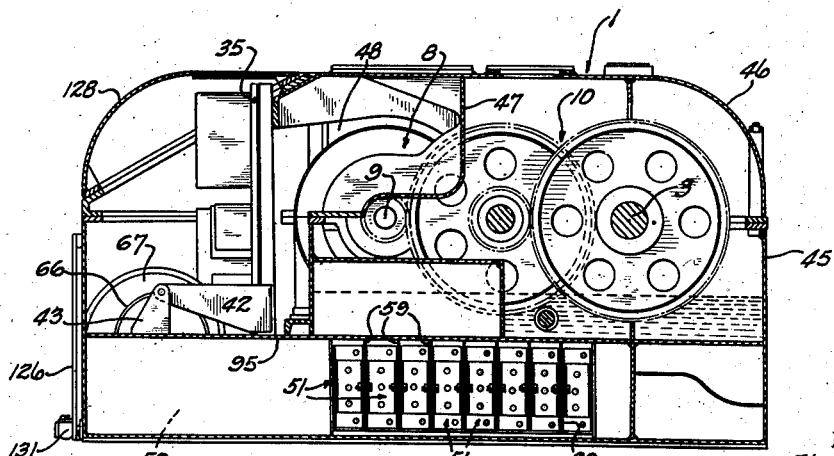

Figures 6, 7, and 8 are views in longitudinal, vertical cross section, taken on lines 6—6, 7—7, and 8—8, respectively, of Figure 5;

Figures 9 and 10 are views in transverse, vertical cross section taken on lines 9—9 and 10—10, respectively, of Figure 5;

Figure 11 is a fragmentary view in longitudinal, vertical cross section taken on line 11—11 of Figure 9;

Figure 12 is a view in horizontal cross section, taken on line 12—12 of Figure 6;

Figure 13 is a fragmentary detail view in horizontal cross section, taken on line 13—13 of Figure 3, parts being shown in elevation for the sake of simplicity in illustration;

Figure 14 is a fragmentary detail view in elevation and on an enlarged scale illustrating the outer end of the air inlet;

Figure 15 is a fragmentary detail view in elevation and on an enlarged scale showing one side of the air inlet and associated parts;

Figures 16 and 17 are detail views partly in cross section and partly in elevation showing the key-slotted lug and key for constraining the valve combined with the air inlet to rectilinear movement;

Figure 18 is a fragmentary view in elevation and on an enlarged scale, illustrating a number of resistor units;

Figure 19 is a view in end elevation looking

Figure 20 is a fragmentary view in horizontal cross section taken on line 20—20 of Figure 18;

Figure 20—A is a fragmentary detail view in top plan showing the track construction employed on the floor of the duct between the blower and the outlets for supporting the resistor units in place in the duct, the framework of several of the resistor units being shown in horizontal cross-section;

Figure 20—B is a fragmentary view in vertical cross-section taken on line 20—B—20—B of Figure 20—A;

Figure 21 is a view in top plan of the tiltable control panel;

Figure 22 is a view thereof in front elevation, the contactors and other control devices of the panel being diagrammatically illustrated;

Figure 23 is a view illustrating the control panel in end elevation;

Figure 24 is a diagram of one circuit arrangement that may be employed for the motors of the winch;

Figure 25 is a graphic diagram of the controller action in the circuit diagrammatically illustrated in Figure 24; and Figure 26 is a graph of the speed, torque curves of the main motor.

Referring to the drawings, it will be seen that a cargo winch embodying the present invention comprises generally a housing indicated as a whole at 1.

At one end of the housing a rotatable drum 2 is provided, the drum being fixed to and rotatable with a drum shaft 3 supported for rotation in bearings 4, 5, and 6 carried by the housing. One end of the shaft 3 projects beyond one side of the housing and has a capstan or windlass 7 fixed thereto.

An electric motor designated generally at 8 is provided for driving the drum in either direction. One end of the armature shaft 9 of the motor 8 is geared to the drum shaft 3, suitable reduction gearing 10 being provided for this purpose.

A magnetic shoe brake designated generally at 11 is combined with the opposite end of the armature shaft 9 of the electric motor 8. Ordinarily and normally this magnetic shoe brake 11 performs all of the necessary braking functions, but for emergency conditions, and as an additional safety factor, a foot brake, designated generally at 12, may be combined with the drum shaft 3.

The foot brake 12 may be of any standard or conventional design and is shown comprising a brake drum 13 fixed to the drum shaft 3 (see Figure 11). A brake band 14 encircles the drum, and its braking engagement with the drum is controlled from an operating shaft 15 interconnected with one end of the band and projecting out through one side of the housing. The opposite end of the brake band 14 is anchored on the housing, as at 14'. A foot pedal 16 is fixed to the outer end of the shaft 15 (see Figures 1, 2, 4 and 5). Adjacent the foot pedal 16 a crank arm 17 is also fixed to the shaft 15 and is connected to one end of a rod 18. The rod 18 extends loosely through an opening in a fixed abutment 19 and through a coil spring 20. One end of the coil spring 20 engages the abutment 19. The other end thereof engages an abutment 21 fixed on the rod 18. Movement of the abutment 21 in one direction is limited by stop bracket 22. The end portion of the rod 18 beyond the abutment 21 thereon slides freely through an opening provided therefor in the stop bracket 22. The purpose of the spring 20 and its associated elements is to maintain the foot pedal 16 and the shaft 15 in such position that the brake 12 will be released. By depressing the foot pedal 16 the shaft 15 is so turned as to bring the brake band 14 into braking engagement with the brake drum 13.

While the magnetic shoe brake 11 per se forms no part of the invention, it is shown to advantage in Figures 5, 6, and 10, and is made up of alined brake shoes 25 and 26, a magnetic armature 27 being directly connected to the brake shoe 25 and the magnetic field 28 being connected through linkage 29 to the brake shoe 26. The usual helical spring 30 interposed between the magnetic armature 27 and magnetic field 28 firmly sets the brake shoes against the brake drum when the power is interrupted.

The control instrumentalities for the electric motor 8 include a tiltable control panel 35 disposed within the housing and carrying the contactors and switches which exercise a regulating effect over the motor circuit, and these control instrumentalities also include a plurality of resistor units located within the housing and electrically interconnected with the motor, all to be hereinafter more fully described.

The control panel 35 includes a suitable rectangular frame 40 on which the panel proper, designated at 41, is mounted and secured. At the lower end of the frame mounting arms 42 are provided and project laterally therefrom and are pivotally connected to supporting lugs 43 provided therefor in the housing. This permits the panel to be tilted to make convenient inspection and service of the bus bars, or the like, carried on the rear thereof.

The housing 1 includes a lower section 45 which provides the support for the major elements of the winch and also a substantial part of the enclosure therefor. The housing is completed by an upper or cover section 46 which when detachably fastened in place completely encloses all of these parts except the body portion of the drum 2. The sections of the housing are formed with complemental internal partitions dimensioned and designed to provide a gear box 47 (see Figure 9) for the reduction gearing 10 and to provide an enclosed compartment 48 which houses the motor, the control panel, and other instrumentalities to be presently described. Suitable gaskets or packing is provided between the sections of the housing to hermetically seal the joint between the same when they are assembled, and this same expedient is also resorted to to seal the joint between cover plates or removable portions wherever used on either section of the housing.

Below the compartment 48, and extending lengthwise of the housing, is a duct 50, one end of the duct communicating with the lower end of the compartment 48 adjacent one end of the housing. In this duct 50 are located the resistor units 51 which are cut in and cut out to control the speed of the motor.

The resistor units are of identical construction and may be quickly inserted in or removed from the duct. Each resistor includes a pair of end channels, designated at 53, which are connected in spaced relation by connecting rods 54 and nuts 55 threaded on the rods and clamping the opposite faces of the bodies of the channels therebetween. The outer channel of each resistor carries a terminal board 56 to which the binding posts 57 are fastened. The terminal board 56 is thus accessible from the exterior. The bottom of the duct 50 is provided with a track 58 for each resistor unit, and the tracks, at their outer ends, are separated by spacer bars 59 provided at spaced intervals along the outside portion of the duct. The side flanges of the channels 62 and the adjacent portions of the bars 59 are provided with registering notches 60 and 61 with which clamping bolts and nuts 62 cooperate in the assembly to releasably secure the resistor units in place. The housing is provided with an opening 63 to render the resistor units conveniently accessible. A cover plate 64, releasably secured to the housing, completes the enclosure of the resistor units and fully protects the same when secured in place.

A blower 66 is provided in the compartment 48 and discharges into the duct 50. An electric motor 67 drives the blower. The blower draws the air from the compartment 48 and forces it through the duct 50 and over the resistor units to cool the same. In order to replenish the supply of air in the compartment 48, an air inlet thereinto is provided on the housing.

The air inlet, designated generally at 70, is shown in Figures 3, 10, and 13 to 17, inclusive, and comprises a cylindrical casing 71 fitted in an opening provided there or in the upper section 46 of the housing, the casing 71 having an outwardly directed annular flange 72 which overlaps the margin of the opening in the housing and is secured thereto by bolts 73, a gasket 74 being interposed between the flange 72 and the margin of the opening in the housing. The casing 71 is open ended, and its inner end portion projects interiorly of the housing to provide a support for a cage 75 which is attached to the inner end of the casing and which affords a mounting and supporting structure for a screen 76. The inner end of the casing 71 is formed with a valve seat 77. A disc-like valve 78 is cooperable with this valve seat 77, and when engaged therewith closes and seals the air inlet and when disengaged from the seat and moved away therefrom provides for the free flow of air into the compartment 48 of the housing although the air is filtered or screened. For the purpose of mounting and controlling the position of the valve 78, the casing 71 is provided with a spider 79 having a central hub 80. A valve-operating shaft, designated generally at 81, has a round and smooth portion rotatably interfitted with the bearing formed on the inner surface of the hub 80. The inner end of the shaft 81 is also rounded and smooth and is rotatably fitted in a bearing 75' provided on the inner wall of the cage 75. A shoulder 82 on the shaft 81 engages the inner end of the hub 80 to constrain the valve-operating shaft 81 against axial movement in one direction. A spoke-like hand-wheel 83 is suitably fixed to the outer end of the shaft 81 and coacts with the outer end of the hub 80 to prevent axial movement of the shaft 81 in the opposite direction and also provides a means which facilitates turning of the shaft 81. Inwardly of the shoulder 82 the shaft 81 is externally threaded and is threadedly engaged with an internally threaded bearing 84 provided at the center of the valve 78. The peripheral portion of the valve 78 is formed with a slotted lug 85 which straddles a key 86 fixed to the cage 75 to constrain the valve to rectilinear movement. With this construction, when the hand-wheel is turned the valve is moved toward and away from its seat depending upon the direction in which the hand-wheel and shaft 81 are turned.

The air which is drawn in through the air inlet circulates through the compartment 48 and in so doing passes over the motor 8 and over the control panel 35 and down to the inlet of the blower 66. The air drawn into the blower is forced through the duct 50 and over the resistor units.

Just beyond the resistor units is a ported partition 90 which defines the end of the duct 50 and one wall of a transverse air passage 91. The air passage 91 extends across the bottom of the drum 2 and communicates with a short stack 92 which directs the air upwardly into outlet passages 93 and 94, and also constitutes a water trap. The outlet passages 93 and 94 extend in opposite directions lengthwise of the housing under the false bottom or floor 95 thereof on which the main motor 8 and the control panel 35 are mounted, and at their ends they communicate with the atmosphere through screened orifices, designated at 96 and 97 (see Figures 6 and 12).

The upper end portion of the stack 92 is formed with a valve seat 98. An outlet valve 99 is cooperable with this valve seat 98 and when engaged therewith it shuts off all communication between the duct 50 and outlet passages 93 and 94 so that the resistors are then completely enclosed and fully protected. The outlet valve 99 is pivotally connected as at 100 to one end of a valve-operating lever 101, the opposite end of this lever 101 being fulcrumed as at 102 on an adjacent wall of the housing. The valve-operating lever 101 is suspended by a link 103 from a valve-actuating lever 104. The actuating lever 104 is pivotally supported intermediate its ends on a fulcrum link 105, the upper end of the link 105 being pivotally connected to the lever 104 and the lower end thereof being pivotally supported on one of the internal partitions of the lower housing section. The end of the lever 104 opposite its connection to the link 103 is bifurcated or yoked, and straddles and is pivotally connected to a traveling nut 106. The nut 106 is threadedly connected with an operating screw 107 rotatably supported in a suitable mounting bracket 108 but constrained against axial movement. The upper end of this screw 107 is connected by means of beveled gearing 109 with an operating shaft 110 supported in suitable bearings provided therefor on the cover section of the housing and projecting at its outer end through the housing and equipped at its outer end with a spoke-like hand-wheel 111 whereby it may be conveniently turned.

When the hand-wheel is turned the shaft 110 is turned, and this motion is transmitted through the beveled gears 109 to the screw 107. Turning of the screw 107 moves the traveling nut 106 along the screw 107 thereby rocking the actuating lever 104 and raising or lowering the valve-operating lever 101 depending upon the direction in which the hand-wheel is turned. In this way the valve 99 may be moved into engagement with its valve seat to close off and seal the duct 50, or it may be moved away from its seat to the position shown in Figure 6 to allow circulation of air through the housing and the exhaust thereof from the duct, up through the stack 92 and out through the outlet passages 93 and 94.

The present invention proposes to insure opening of the air inlet and outlet valves as a condition precedent to operation of the winch, and accomplishes this, first by incorporating switches in the circuit for the blower motor 67 and controlling the position of these switches by the air inlet and outlet valves in such manner that when the valves are closed the switches are open whereas when the valves are open the switches are closed. When the switches are closed the blower motor starts and circulates air through the air distributing system constituted by the air inlet and outlet, the partitions within the housing which define the compartment for the electric motor, the panel, the blower motor, and the duct. Furthermore, the circuit for the main motor 8 is interlocked with the circuit for the blower motor 67 in such manner that current may not be supplied to the main motor 8 unless the blower motor 67 is functioning.

In carrying out these purposes a switch 115 (see Figures 13 to 15 and 24) is supported adjacent the air inlet 70 but within the housing, the switch 115 being biased to closed position and having a switch-operating lever 116 projecting exteriorly thereof and being equipped with a roller 117. The roller 117 is located in the path of a switch-actuating arm 118, which is secured by bolts and nuts, or other suitable securing means, 119 to the valve 78. The arrangement is such that when the inlet valve 78 is closed the switch-operating arm 118 presses against the roller 117 and moves the switch-operating lever 116 to open position, as shown in full lines in Figure 15. However, when the valve 78 is moved to open position, the arm 118 is retracted and the switch under the influence of its bias swings over to closed position, as illustrated in dotted lines in Figure 15.

A second switch 120 is also incorporated in the blower circuit in series with the switch 115, the switch 120 being supported within the housing on the bracket 108, it also being biased to open position but having a switch operating lever 121 equipped with the roller 122 which is disposed in the path of a camming projection 124, the latter being conveniently constituted by providing an integral projection on the switch-actuating lever 104. The roller 122 of the switch-operating lever 121 lies in the path of movement of the camming projection 124 of the lever 104 and the arrangement is such that when the valve 99 is open, the camming projection 124 engages roller 122 and closes the switch 120, as illustrated in Figure 6. However, when the valve 99 is closed the lever 104 and its projection 124 swing downwardly and away from the roller 122 of the switch-operating lever 121 so that the switch 120 opens under the influence of its own bias.

With the on-off switch in the "on" position, the blower motor is started by opening the valves for the air inlet and air discharge ducts. The energizing of the blower motor contactor energizes the coil of the under-voltage relay UV which permits power from line L2 to be brought to one side of all contacts in the cam-operated master. The UV relay is energized and maintains itself through one of its contacts as long as the overload relay contact remains closed. By referring to the diagram, it will be noted that after the UV relay drops out due to an undervoltage or an overload condition, the master must be returned to the "off" position to pick up the UV relay.

Moving the master to the first position in the hoist direction energizes the contactors H, M, 2DB, BR, 1A and 1KO. The BR contactor energizes the shunt brake to release this brake. Contactor 2DB which is a normally closed contactor opens to open the dynamic braking circuit. Contactors M and H close to set up the power circuit through the motor armature and series field. Contactor 1KO closes to provide a shunt path around the motor armature.

In the second position hoisting contactor 2A is closed cutting out of circuit resistor R2—R3. This provides additional torque and speed as indicated by curve #2 in Figure 26. Contactor 1KO is deenergized and its contacts on opening break the shunt path around the motor armature.

On the third point in the hoisting direction contactor 3A is energized and short circuits resistor step R3—R4. On the fourth point of the master, contactor 4A is energized and short circuits resistor step R5—R6. On the fifth point, 5A closes.

The normally closed interlock on contactor 5A thereupon disconnects the shunt coil of contactor FS. The series coil of contactor FS is set to open its contacts when the torque on the motor is approximately 60 per cent or less to provide an increased light line hoisting speed, as indicated in Figure 26. On all other speed points the shunt coil is connected across the line to provide a strong field.

In the lowering direction, as in the hoisting direction, to operate the winch the inlet and outlet air valves of the machine must be opened and the blower motor running.

When the master is thrown to the first point lowering direction, contactors 1DB, M, 2DB, BR, 1KO, and all of the accelerating contactors close immediately.

The shunt coil of relay FS is energized through an interlock on 1KO. During power lowering the shunt coil and the series coil of this relay buck each other and the relay remains open, but when the current in the armature circuit reverses, the series coil aids the shunt coil and relay FS closes to provide full shunt field.

In lowering, the circuit is considerably different from that in the hoisting direction. From line L2 the circuit is through 1KO resistor R11—R12 to the junction between the motor armature and the series field. From this point there are two parallel circuits. One is through the series field and the closed contacts of accelerating contactors 1A, 2A and 3A to the M contactor and the other is through the armature, the closed contacts on accelerating contactors 5A and 4A, resistor step R8—R7, and the closed contacts of contactor 1DB to the M contactor. This connection is somewhat similar to a shunt motor in that the series field current can be controlled independently of the armature current.

In the first position lowering a very low speed and low torque is obtained as indicated on curve #1 in Figure 26. This has been designed to provide just sufficient torque to move the light hook downward at a very slow speed.

In the second position lowering contactors 4A and 5A are deenergized to insert resistors R5—R6 and R6—R7 into the armature circuit. This does not provide any more torque, but does allow a higher speed on overhauling loads as indicated by curve #2 in Figure 26.

In the third position lowering, contactor 3A is deenergized to provide a slightly weaker series field. By increasing the resistance in the series field the armature current is increased slightly for power lowering and consequently the armature torque is increased slightly. The speeds and torques obtained on this point are shown on curve #3 in Figure 26.

In the fourth and fifth positions of the master the field is weakened still more to provide higher speeds and slightly increased power lowering torques, as shown on curves #4 and #5 in Figure 26.

When the master is moved to the fifth position, contactor IA is deenergized to insert into the series field circuit resistor R1—R2 which is a comparatively high resistor to reduce the series field to a very low value. Contactor 2KO is energized to a short circuit resistor R11—R12 and contactor 5A is energized to short circuit resistor step R6—R7. This speed point provides for high speed lowering of the light hook and through the operation of the FS relay as discussed previously provides a safe high speed for the lowering of a normal load.

With the winch constructed in the manner described and shown in the accompanying drawings, the upper or cover section 46 of the housing may be removed as a unit which exposes all of the elements shown in Figure 5 for the purposes of inspection, replacement, service, and repair. Access to the resistor units is conveniently had simply by removing the cover plate 64. In addition to these provisions for rendering the elements of the winch readily accessible, the base section of the housing also has an opening 125 in the end wall thereof adjacent the blower 66 and its motor 67. This opening is normally closed by the removable cover 126 which is bolted in place and suitably sealed with a gasket or packing. When this cover plate 126 is removed, the blower and its motor are accessible and it is not necessary to remove the entire cover section.

A similar provision is made for rendering the magnetic shoe brake 11 conveniently accessible, a removable cover plate 127 illustrated in Figure 4 being provided for this purpose. Another important provision made to insure complete and convenient accessibility of the various parts is the construction of the cover section 46 with a removable portion 128 which has a sloping or curved formation so as to present no obstruction to operating lines controlled by the winch. The removable portion 128 is flanged at 129 to facilitate its convenient bolting in place, and may be equipped with suitable handles 130. When this portion 128 is removed, the control panel 35 is conveniently accessible.

The upper and lower sections of the housing have integral therewith, or rigidly fastened thereto, the complemental internal partitions which define the gear box 47, the compartment 48, and which also provide a complete enclosure for the outlet valve and its operating mechanism so that the air flowing up through the stack 92 will be constrained to flow out through the outlet passages 93 and 94 and their terminals or orifices 96 and 97. Any moisture which finds its way in through the outlet openings is trapped since the stack 92 functions also as a water trap, and such moisture, or any condensation which is trapped, may be drained off through suitable drain cocks 131.

The main electric motor 8 is of any suitable construction but preferably has its housing constructed of two half sections, flanged as at 132, and bolted firmly together by bolts 133. While this provides for convenient access to the interior of the motor, there is an uninterrupted magnetic flux path. The motor 8 may also be provided with a fan which rotates with its armature to internally cool the same.

The primary and essential, basic feature of the invention is the housing and complete enclosure and protection of the resistor units, the contactors, and other control instrumentalities, and the provision made for dissipating the heat therefrom when they are functioning.

Various other changes of design may be resorted to if the fundamental features and essentials of the structural organization are preserved.

While we have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

We claim:

1. A cargo winch comprising a housing, a rotatable drum supported on the housing, an electric motor disposed within the housing, gearing between the motor and the drum, control instrumentalities for the electric motor including a control panel and resistor units, said housing being internally partitioned to provide a gear box for said gearing and a compartment within which said electric motor and said control panel are disposed, said housing having an air inlet communicating with said compartment and also having an air outlet, a duct within the housing leading from said compartment to said outlet and within which said resistor units are disposed, and means for circulating air through the air inlet, compartment and duct, and thence through the outlet to the atmosphere.

2. A cargo winch comprising a housing, a rotatable drum supported on the housing, an electric motor, gearing between the motor and drum, control instrumentalities for the electric motor including a control panel and resistor units, said housing being internally partitioned to provide a compartment within which said control panel is disposed, said housing having an air inlet communicating with said compartment, said housing having an air outlet, a duct within the housing leading from said compartment to said outlet, said resistor units being disposed in said duct, and a motor-driven blower disposed in said compartment and combined with the duct to draw air in through said inlet, to exhaust it from said compartment and advance it through the duct and out through the outlet.

3. A cargo winch comprising a housing, a rotatable drum supported on the housing, an electric motor, gearing between the motor and drum, control instrumentalities for the electric motor including a control panel and resistor units, said housing being internally partitioned to provide a compartment for said control panel, said housing having an air inlet communicating with said compartment, said housing having an air outlet, a duct within the housing leading from said compartment to the outlet, said resistor units being disposed in said duct, a motor-driven blower disposed in said compartment and combined with the duct to draw air in through said inlet, exhaust it from the compartment, and advance it through the duct and out through said outlet, a manually operable valve for opening and closing said inlet, said duct having a valve seat therein adjacent the outlet, and a manually operable valve cooperable with said valve seat to open and close communication between the duct and outlet.

4. A cargo winch comprising a housing, a rotatable drum supported on the housing, an electric motor, gearing between the motor and drum, control instrumentalities for the electric motor including a control panel and resistor units, said housing being internally partitioned to provide a compartment for said control panel, said housing having an air inlet communicating with said compartment, said housing having an air outlet, a duct within the housing leading from said compartment to the outlet, said resistor units being disposed in said duct, a motor-driven blower disposed in said compartment and combined with the duct to draw air in through said inlet, exhaust it from the panel compartment and advance it through the duct and out through said outlet, a manually operable valve for opening and closing said inlet, said duct having a trap adjacent said outlet, said trap being provided with a valve seat, and a manually operable valve cooperable with said valve seat for opening and closing communication between said outlet and said duct.

5. A cargo winch comprising a housing, a rotatable drum supported on the housing, an electric motor geared to the drum for driving the same, control instrumentalities for said motor including a control panel and resistor units, said housing providing a complete enclosure for said control panel and said resistor units, said housing having inlet and outlet openings, an air distributing system within the housing and comprising internal partitions providing for flow of air from the inlet opening over the control panel and also including a duct leading to the outlet opening and in which the resistor units are disposed, said duct having a trap interposed between the resistor units and the outlet opening to protect the resistor units from water finding its way into the outlet opening, and means for advancing air through said air distributing system.

6. A cargo winch comprising a housing, a rotatable drum supported on the housing, an electric motor geared to the drum for driving the same, control instrumentalities for the motor including a control panel and resistor units located within the housing, said housing providing a complete enclosure for said control panel and said resistor units, said housing having air inlet and outlet openings and being internally partitioned to provide an air distributing system within the housing between said openings to cause air flowing in through the inlet and out through the outlet openings to pass over said control panel and said resistor units, a blower within the housing for advancing air through said air distributing system, an electric motor for driving the blower, manually operable valves for said air inlet and outlet openings, interlocked electric circuits for said electric motors, and switches controlled by said valves and incorporated in said circuits for preventing completion of said circuits when said valves are closed.

7. A cargo winch comprising a housing, a rotatable drum supported on the housing, an electric motor disposed within the housing, gearing between the motor and the drum, control instrumentalities for the electric motor including a control panel and resistor units, said housing being internally partitioned to provide a gear box for said gearing, and a compartment for said electric motor and said control panel, said housing having an air inlet communicating with said compartment and also having an air outlet, a duct within the housing leading from said compartment to the outlet and accommodating said resistor units, and means for circulating air through the air inlet, compartment, and duct, and thence through the outlet to the atmosphere, said housing comprising upper and lower sections, means for releasably securing said sections together, the upper section being removable to provide for access to the electric motor, the gearing and said control panel, said lower section having a removable plate for providing for convenient access to said resistor units.

8. A cargo winch comprising a housing, a drum rotatably supported on said housing, an electric motor disposed within the housing, gearing between the motor and the drum, control instrumentalities for the electric motor also disposed within the housing and including a control panel, said housing providing a complete enclosure for said electric motor and said control instrumentalities, said housing having air inlet and outlet openings, said housing comprising upper and lower sections having complemental internal partitions defining a gear box for said gearing, a compartment for said motor and panel, and an air distributing system leading from the inlet to the outlet and through said compartment for circulating air over said motor and said panel, the upper section of the housing being readily removable to provide for access to said motor, said gearing, and said panel.

9. A cargo winch comprising a housing, a drum rotatably supported on said housing, an electric motor disposed within the housing and geared to the drum for driving the same, control instrumentalities for said electric motor including a control panel and resistor units, said housing having air inlet and air outlet openings, said housing comprising upper and lower sections having complemental internal partitions defining a compartment in which said electric motor and said control panel are disposed, said lower section having a duct leading from said compartment to said outlet opening, said resistor units being disposed in said duct, said upper section being removable to provide for access to said electric motor and said control panel, an opening in said housing to provide for access to said resistor units, and a cover plate for said opening.

10. A cargo winch comprising a housing, a drum rotatably supported on said housing, an electric motor disposed within the housing and geared to the drum for driving the same, control instrumentalities for said electric motor also disposed within the housing and including a tiltable control panel, said housing providing a complete enclosure for said electric motor and said control instrumentalities, said housing having air inlet and air outlet openings, said housing having means therein defining a compartment for said motor and said panel, and an air distributing system within the housing leading from the inlet through said compartment to said outlet, means for circulating air through said air distributing system and over said motor and control panel, said housing having a removable portion in the region of the panel to provide for access to the panel alone, the tilting mounting of the panel rendering access to both sides thereof convenient when said portion is removed.

11. A cargo winch comprising a housing, a drum rotatably supported on said housing an electric motor disposed within the housing and geared to the drum for driving the same, control instrumentalities for said electric motor including a control panel and a plurality of individual resistor units electrically interconnected with the motor, said housing having air inlet and air outlet openings, said housing comprising upper and lower sections having complemental internal partitions defining a compartment within the housing in which said electric motor and said control panel are disposed, said lower section having a duct leading from said compartment to said outlet, said resistor units being disposed in said duct, readily releasable means for securing said resistors in place in said duct and providing for the independent insertion and removal thereof, an opening in said housing through which said units may be inserted and removed, and a cover plate for said opening detachably secured to said housing.

12. A cargo winch comprising a housing, a rotatable drum supported on the housing, an electric motor disposed within the housing, gearing between the motor and the drum, control instrumentalities for the electric motor including a control panel and resistors, said housing being internally partitioned to provide a gear box for said gearing and a compartment within which said electric motor and said control panel are disposed, and said housing having an air inlet and an air outlet, and means for circulating air through said air inlet, compartment and said air outlet.

13. A cargo winch comprising a housing, a rotatable drum supported on the housing, an electric motor disposed within the housing, gearing between the motor and the drum, control instrumentalities for the electric motor including a control panel and resistors, said housing being internally partitioned to provide a gear box for said gearing and a compartment within which said electric motor and said control panel are disposed, and said housing having an air inlet and an air outlet, a manually operable member for opening and closing said air inlet, and means for circulating air through said air inlet, said compartment and said air outlet.

14. A cargo winch comprising a housing, a rotatable drum supported on the housing, an electric motor disposed within the housing, gearing between the motor and the drum, control instrumentalities for the electric motor including a control panel and resistors, said housing being internally partitioned to provide a gear box for said gearing and a compartment within which said electric motor, said control panel and said resistors are disposed, and said housing having an air inlet and an air outlet, a manually operable member for opening and closing said air inlet, a manually operable member for opening and closing said air outlet, a circuit, a limit switch for said circuit, means including said manually operable members adapted to be adjusted to cause said air inlet and air outlet to be opened up and said limit switch to be in the closed condition of said circuit and said air inlet and air outlet to be closed and said limit switch to be in the open condition of said circuit, and means adapted to be operative when said air inlet and air outlet are open to cause the interior of said compartment to be ventilated.

15. A cargo winch comprising a housing, a rotatable drum supported on the housing, an electric motor, gearing between the motor and the drum, control instrumentalities for the electric motor including a control panel and resistors, said housing being internally partitioned to provide a gear box for said gearing and a compartment within which said control panel and said resistors are disposed, and said housing having an air inlet and an air outlet, a manually operable member for opening and closing said air inlet, a manually operable member for opening and closing said air outlet, a circuit, a limit switch for said circuit, means including at least one of said manually operable members adapted to be adjusted to cause said air inlet and air outlet to be opened and said limit switch to be in the closed condition of said circuit and said air inlet and air outlet to be closed and said limit switch to be in the open condition of said circuit, and means adapted to be operative when said air inlet and air outlet are open to cause the interior of said compartment to be ventilated.

HENRY F. BANZHAF.
ALEX. FINLAY.